US009218479B2

(12) United States Patent  
Collinge et al.

(10) Patent No.: US 9,218,479 B2  
(45) Date of Patent: Dec. 22, 2015

(54) METHOD AND SYSTEM FOR COMPUTING CODE MANAGEMENT PLATFORM

(71) Applicant: MasterCard International Incorporated, Purchase, NY (US)

(72) Inventors: Mehdi Collinge, Braine-l'Alleud (BE); Susan Thompson, Burland (GB); Axel Emile Jean Charles Cateland, Scarsdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/463,054

(22) Filed: Aug. 19, 2014

(65) Prior Publication Data

US 2015/0058949 A1    Feb. 26, 2015

Related U.S. Application Data

(60) Provisional application No. 61/867,834, filed on Aug. 20, 2013, provisional application No. 61/876,342, filed on Sep. 11, 2013, provisional application No. 61/886,843, filed on Oct. 4, 2013, provisional application No. 61/910,781, filed on Dec. 2, 2013.

(51) Int. Cl.
  *H04L 29/06* (2006.01)
  *G06F 21/44* (2013.01)

(52) U.S. Cl.
  CPC ............... *G06F 21/44* (2013.01); *H04L 63/08* (2013.01); *H04L 63/0876* (2013.01); *H04L 63/18* (2013.01)

(58) Field of Classification Search
  CPC ..... G06F 21/44; H04L 63/08; H04L 63/0823; H04L 63/0876; H04L 63/18
  USPC .......................................................... 726/7
  See application file for complete search history.

(56) References Cited

U.S. PATENT DOCUMENTS

2008/0114983 A1    5/2008    Sherkin et al.
2008/0155260 A1    6/2008    Perez et al.
2010/0154066 A1    6/2010    Hammes et al.

FOREIGN PATENT DOCUMENTS

WO    2012/167352 A1    12/2012
WO    2013/089591 A1    6/2013

OTHER PUBLICATIONS

Notification of Transmittal of the International Search Report (Forms PCT/ISA/220 and PCT/ISA/210) and Written Opinion of the International Searching Authority (Form PCT/ISA/237) issued on Nov. 27, 2014, in corresponding International Application No. PCT/US2014/051321. (10 pages).

*Primary Examiner* — Yogesh Paliwal
(74) *Attorney, Agent, or Firm* — Buchanan Ingersoll & Rooney PC

(57) ABSTRACT

A method for authenticating a computing device includes: storing an account profile, the profile including data related to a service account including an alphanumeric code; generating a session identifier and a seed value; computing a first hash using the session identifier; computing a second hash using the session identifier and the alphanumeric code; computing a third hash using the second hash and a utilized seed value; transmitting the session identifier to a computing device via a first communication protocol; transmitting the session identifier and first hash to a remote notification service for transmission to the computing device via a second communication protocol; receiving a fourth hash and the session identifier from the computing device via the first communication protocol; validating the fourth hash based on a comparison of the fourth hash and the computed third hash; and transmitting a validation result to the computing device based on the validation step.

20 Claims, 9 Drawing Sheets

US 9,218,479 B2

METHOD AND SYSTEM FOR COMPUTING CODE MANAGEMENT PLATFORM

RELATED APPLICATION

This application is related to commonly assigned U.S. Provisional Patent Application No. 61/867,834, "Method and System for Computing Code Management Platform," by Mehdi Collinge et al., filed Aug. 20, 2013; commonly assigned U.S. Provisional Patent Application No. 61/876,342, "Method and System for Computing Code Management Platform," by Mehdi Collinge et al., filed Sep. 11, 2013; and commonly assigned U.S. Provisional Patent Application No. 61/886,843, "Method and System for Computing Code Management Platform," by Mehdi Collinge et al., filed Oct. 4, 2013, and commonly assigned U.S. Provisional Patent Application No. 61/910,781, "Method and System for Computing Code Management Platform," by Mehdi Collinge et al., filed Dec. 2, 2013, which are herein incorporated by reference in their entirety.

FIELD

The present disclosure relates to the authentication of a computing device using an alphanumeric code input by a user, specifically the use of dual channel authentication and multiple hashes to enable a user to authenticate a computing device via the input of an alphanumeric code.

BACKGROUND

As more and more people begin to own computing communication devices, such as cellular phones, smart phones, tablet computers, smart watches, etc., new functions, applications, and utilities are being developed for these devices to take advantage of better technologies and the large and increasing user base. However, due to the ease at which such devices may be lost, stolen, or misplaced, ensuring that the user of a computing device is authentic when performing sensitive actions, such as conducting a payment transaction or managing private information, is of great importance. Similarly, many entities, such as payment networks, financial institutions, insurance companies, etc., may also have a desire to be assured that the computing device itself is authentic, such as to prevent the use of a cloned or tampered-with application program or device.

Some methods have been developed to authenticate a user of a computing device or the computing device itself. For instance, one method includes the use of a one-time password provided by an entity requesting the authentication. For example, a financial institution may e-mail a user a confirmation code to be input into the computing device, to insure that the user is who they claim to be. However, if such codes are only used occasionally, there is a risk that actions performed in between confirmations may be fraudulent. Conversely, if such codes are used every time an action is performed, it may require the user to be at a location where the code may be received, which may inconvenience the user, or the user may use a different application on the computing device to receive the code, which may defeat the purpose of using the code.

Another method for authenticating a user includes the input of a personal identification number (PIN) by the user in the application program each time an action is performed. The PIN is then sent back to a server, such as at a payment network or financial institution, and verified. However, in such methods, the computing device does not verify that the entity requesting the PIN is a valid entity, and thus may be subject to fraudulent requests. Similarly, the use of a single communication channel to communicate with the entity may result in a higher chance of the communication being compromised.

Thus, to address at least these technical problems as well as others, there is a need for a technical solution in the form of a method for authenticating a computing device that ensures authentication of both the device and the server performing the authentication, and that uses more than one channel communication for a stronger, more effective authentication process.

SUMMARY

The present disclosure provides a description of systems and methods for authentication of a computing device.

A method for authenticating a computing device includes: storing, in an account database, an account profile, wherein the account profile includes data related to a service account including at least an account identifier, a device identifier, and an alphanumeric code; generating, by a processing device, a session identifier and a seed value; computing, by the processing device, a first hash using at least the session identifier; computing, by the processing device, a second hash using at least the session identifier and the alphanumeric code; computing, by the processing device, a third hash using at least the second hash and a utilized seed value; transmitting, by a transmitting device, the session identifier to a computing device via a first communication protocol; transmitting, by the transmitting device, the session identifier and first hash to a remote notification service for transmission to the computing device via a second communication protocol; receiving, by a receiving device, at least a fourth hash and the session identifier from the computing device via the first communication protocol; validating, by the processing device, the fourth hash based on a comparison of the fourth hash and the computed third hash; and transmitting, by the transmitting device, a validation result to the computing device based on the validation step.

Another method for authenticating a computing device includes: storing, in a memory, at least an account identifier and a device identifier; transmitting, by a transmitting device, at least the stored account identifier and device identifier via a first communication protocol; receiving, by a receiving device, at least a session identifier via the first communication protocol; computing, by a processing device, a first hash using the received session identifier; receiving, by the receiving device, the session identifier and a second hash via a second communication protocol; validating, by the processing device, the second hash based on comparison of the second hash and the computed first hash; receiving, by an input device, an alphanumeric code; computing, by the processing device, a third hash using at least the received session identifier and the received alphanumeric code; computing, by the processing device, a fourth hash using at least the third hash and a seed value; and transmitting, by the transmitting device, at least the session identifier and computed fourth hash via the first communication protocol.

A system for authenticating a computing device includes an account database, a processing device, a transmitting device, and a receiving device. The account database is configured to store an account profile, wherein the account profile includes data related to a service account including at least an account identifier, a device identifier, and an alphanumeric code. The processing device is configured to: generate a session identifier and a seed value; compute a first hash using at least the session identifier; compute a second hash using at least the session identifier and the alphanumeric code; and compute a third hash using at least the second hash and a utilized seed value. The transmitting device is configured to: transmit the session identifier to a computing device via a first communication protocol; and transmit the session identifier and first hash to a remote notification service for transmission to the computing device via a second communication protocol. The receiving device is configured to receive at least a fourth hash and the session identifier from the computing device via the first communication protocol. The processing device is further configured to validate the fourth hash based on a comparison of the fourth hash and the computed third hash. The transmitting device is further configured to transmit a validation result to the computing device based on the validation step.

Another system for authenticating a computing device includes an input device, a memory, a transmitting device, a receiving device, and a processing device. The memory is configured to store at least an account identifier and a device identifier. The transmitting device is configured to transmit at least the stored account identifier and device identifier via a first communication protocol. The receiving device is configured to receive at least a session identifier via the first communication protocol. The processing device is configured to compute a first hash using the received session identifier. The receiving device is further configured to receive the session identifier and a second hash via a second communication protocol. The processing device is further configured to validate the second hash based on comparison of the second hash and the computed first hash. The input device is configured to receive an alphanumeric code. The processing device is even further configured to compute a third hash using at least the received session identifier and the received alphanumeric code, and compute a fourth hash using at least the third hash and a seed value. The transmitting device is further configured to transmit at least the session identifier and computed fourth hash via the first communication protocol.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Authenticating a Computing Device

Figure 1:
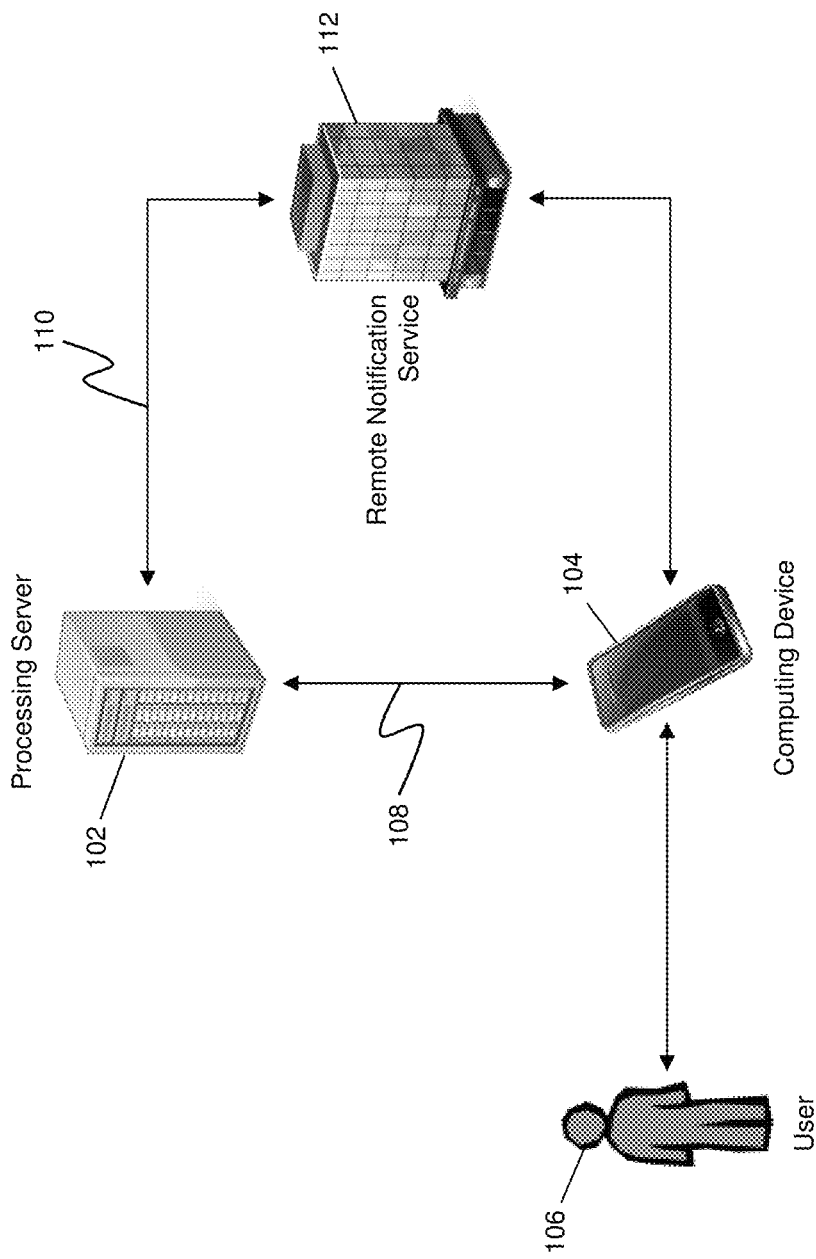
FIG. 1 is a high level architecture illustrating a system for the authentication of a computing device in accordance with exemplary embodiments.

FIG. 1 illustrates a system 100 for the authentication of a computing device using via alphanumeric code using hashes and dual channel communication.

The system 100 may include a processing server 102. The processing server 102, discussed in more detail below, may be configured to authenticate a computing device 104 using the methods and systems discussed herein. The computing device 104, also discussed in more detail below, may be any type of computing device suitable for performing the functions disclosed herein as will be apparent to persons having skill in the relevant art, such as a cellular phone, smart phone, laptop computer, tablet computer, notebook computer, smart watch, personal digital assistant, desktop computer, smart television, computing server, etc.

The computing device 104 may be used by a user 106. The user 106 may use the computing device 104 and register the computing device 104 with the processing server 102 using methods and systems that will be apparent to persons having skill in the relevant art. For instance, the processing server 102 may provide the user 106 with a registration code to input in an application program executed by the computing device 104 during the registration process. Also as part of the registration, the processing server 102 may receive a device identifier associated with the computing device 104, such as a registration number, serial number, media access control address, or other type of unique value suitable for identification of the computing device 104.

As part of the registration, the user 106 may also register an account with the processing server 102 in addition to registering the computing device 104. The account may be registered via an account identifier, which may be identified by the processing server 102, set by the user 106, set by the computing device 104, etc. The account identifier may be a unique value associated with an account suitable for identification of the corresponding account, such as an identification number, username, e-mail address, phone number, etc. In some instances, the account identifier may be a payment account number, such as corresponding to a payment account associated with the user 106, such as in an instance where the computing device 104 may be authenticated for use of a computing wallet application program to conduct a payment transaction.

The user 106 may also provide an alphanumeric code as part of the registration process, to be used to authenticate the user and/or computing device 104. The alphanumeric code may be a code comprising a plurality of alphanumeric characters and may be set by the user 106, provided by the processing server 102, or provided by a third party, such as a financial institution associated with a payment account registered with the processing server 102.

The processing server 102 may store the account and device identifiers in a database, discussed in more detail below, and may then be ready to authenticate the computing device 104 when necessary. In an exemplary embodiment, the computing device 104 may include a wallet application program, such as for use in conveying payment credentials to a merchant for the conducting of a payment transaction. In such an embodiment, the processing server 102 may be configured to authenticate the computing device 104 prior to the conveyance of payment credentials to a merchant (e.g., from the computing device 104, the processing server 102, or a third party, such as a payment network or financial institution).

As part of the authentication process, discussed in detail below, the processing server 102 may communicate with the computing device 104 using a first communication protocol 108. The first communication protocol may be a secure sockets layer (SSL) and/or transport layer security (TLS) protocol or other type of communication protocol suitable for secure communication between the processing server 102 and computing device 104 as will be apparent to persons having skill in the relevant art.

The processing server 102 may also communicate with the computing device 104 using a second communication protocol 110. In an exemplary embodiment, the second communication protocol 110 may utilize a remote notification service 112 for delivering communications to the computing device 104 via the second communication protocol 110. The remote notification service 112 may be configured to push information to the computing device 104, such as via a push notification standard provided by a vendor of the computing device 104 and/or based on software (e.g., application programs) executed by the computing device 104, such as Google Cloud Messaging, Apple Push Notification Services, etc.

The use of two different communication protocols may provide for stronger authentication of the computing device 104 and user 106, and also of the processing server 102 as a genuine requestor of information. As discussed in more detail below, the computing device 104 may validate data received via both the first communication protocol 108 and the second communication protocol 110, which may enable the computing device 104 to be sure that the processing server 102 requesting authentication is itself authentic and trustworthy.

As discussed in more detail below, the processing server 102 may generate a session identifier for use in authenticating the computing device 104. The session identifier may be transmitted to the computing device 104 via the first communication protocol 108. The processing server 102 may also compute a hash using the session identifier, which may then be transmitted to the remote notification service 112 for pushing to the computing device 104 via the second communication protocol 110. The computing device 104 may then compute its own hash using the session identifier received via the first communication protocol 108 and compare it to the hash received from the remote notification service 112 to validate the processing server 102.

The computing device 104 may then prompt the user 106 to enter the alphanumeric code registered to the account being used. The user 106 may enter the alphanumeric code, which may then be used in conjunction with the session identifier to compute a new hash. The new hash may then be transmitted to the processing server 102 via the first communication protocol 108. The processing server 102 may compute its own version of the new hash using the stored data regarding the alphanumeric code and the generated session identifier, and then validate the alphanumeric code input by the user 106 by comparing the new hash received from the computing device 104 and its own computed new hash.

In some embodiments, a seed value may also be used in order to strengthen the authentication of the computing device 104. In such an embodiment, the processing server 102 may generate a seed value, which may be a random or pseudorandom value suitable for use in providing increased authentication of the computing device 104 and the selected account. The generated seed value may be transmitted to the remote notification service 112 along with the first hash, which may then be pushed to the computing device 104 via the second communication protocol 110.

The computing device 104 may use the seed value to compute a third hash using the new hash, computed based on the alphanumeric code and session identifier, and the seed value. The third hash may be transmitted to the processing server 102 instead of the new hash, which may be validated by the processing server 102 to authenticate the computing device 104. The use of the seed value and the extra hash may thereby result in increased security and therefore a stronger authentication of the computing device 104.

In instances where the second communication protocol 110 may be unavailable, the computing device 104 may be configured to use a fallback seed in place of the seed value. In such an instance, the processing server 102 may provide an extra fallback seed to the computing device 104 upon successful authentication using the methods and systems discussed herein using both the first and second communication protocols 108 and 110. The computing device 104 may then use the fallback seed in place of the seed value when computing the third hash, which may be used for the added security in instances where the second communication protocol 110 may be unavailable.

In some embodiments, the processing server 102 may also combined the methods and systems disclosed herein with additional tools and methods for authentication. For example, a token may be used as an additional authentication tool. In such an example, the processing server 102 may transmit a token to the computing device 104 using the remote notification service 112 via the second communication protocol 110. The computing device 104 may then return the token to the processing server 102 during the authentication process (e.g., with the hash computed using the alphanumeric code and/or seed value) via the first communication protocol 108. The processing server 102 can then validate the token as an additional method of authentication of the computing device 104 in addition to using the alphanumeric code. In such an instance, the token may be a life-long token, such as defined using the OAuth protocol, or may be a limited-use or single-use token, which may be provided to the computing device 104, either in addition to or separately from, the session identifier and/or seed value. In some embodiments, the token may be provided to the processing server 102 by a third party, such as an entity or service that may use the processing server 102 for authentication of the computing device 104. In such an embodiment, the processing server 102 may be configured to return the token to the third party following validation of the token and authentication of the computing device 104.

Methods and systems discussed herein for authenticating the computing device 104 via an alphanumeric code and utilizing the first and second communication protocols 108 and 110 may be beneficial as using a dual channel authentication method, in combination with an alphanumeric code that is hashed using data that is validated and received via the dual channel communication, may result in increased security, and therefore a stronger authentication. In addition, by utilizing the already-established two communication protocols and the systems of the processing server 102 discussed herein, additional authentication methods may be combined with those discussed herein to further increase the authentication.

Processing Server

Figure 2:
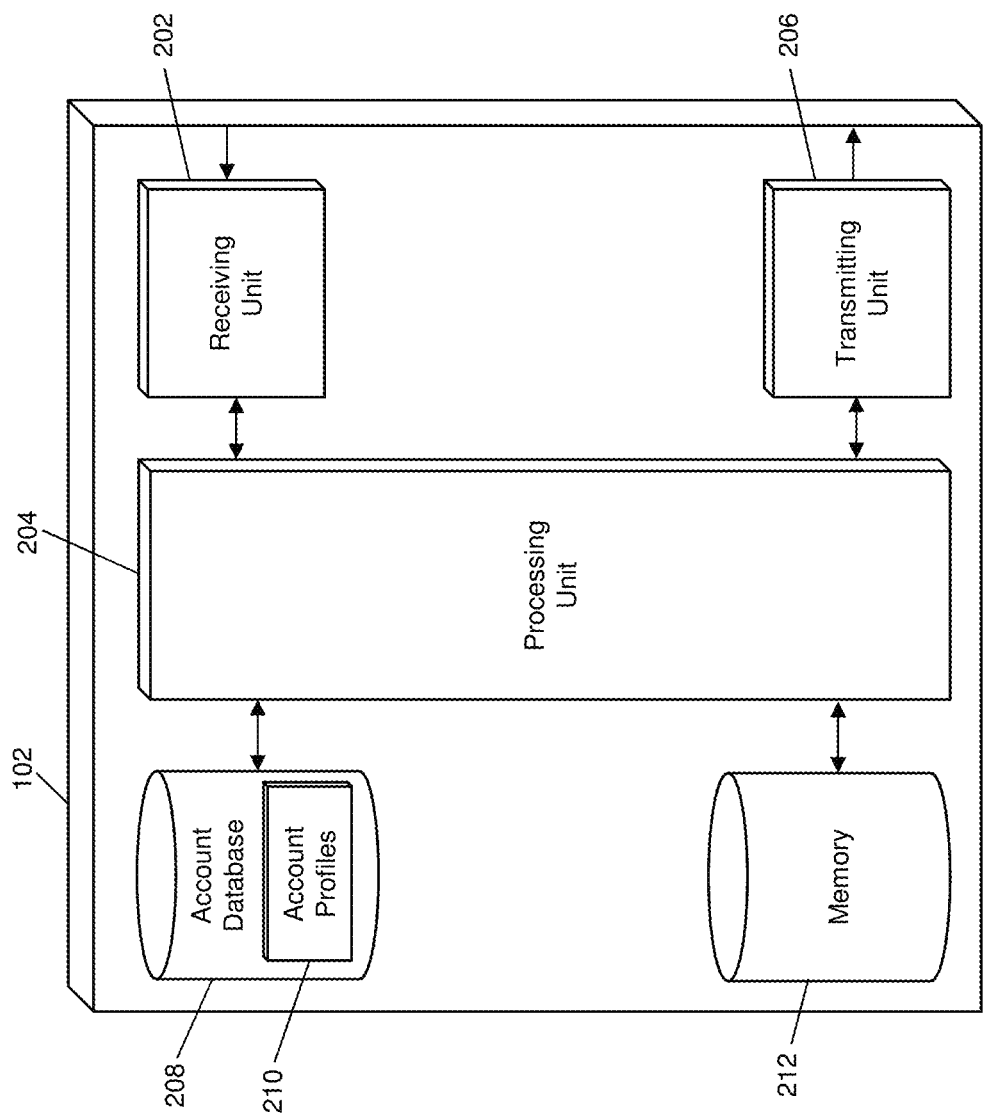
FIG. 2 is a block diagram illustrating the processing server of FIG. 1 for authenticating a computing device in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving unit 202. The receiving unit 202 may be configured to receive data over one or more networks via one or more network protocols, such as via the first communication protocol 108 and the second communication protocol 110. The receiving unit 202 may be configured to receive data from the computing device 104, such as account registration data, device data, tokens, and computed hashes used for authentication of the computing device 104. The receiving unit 202 may also receive data regarding an authentication, such as a service request to begin an authentication process, or authentication data for use in an authentication, which may include a hashed alphanumeric code and/or seed value and a session identifier.

The processing server 102 may also include an account database 208. The account database 208 may be configured to store a plurality of account profiles 210. Each account profile 210 may include data related to an account that is to be authenticated, such as a transaction account, payment account, user account, etc. The account profile 210 may include at least an account identifier, device identifier, and an alphanumeric code. As discussed above, the account identifier may be a unique value associated with the account profile 210, the device identifier may be a unique value associated with a computing device 104 that is being authenticated, and the alphanumeric code may be a code provided by the user 106 during registration that is used for authentication.

The processing server 102 may further include a processing unit 204. The processing unit 204 may be configured to generate a session identifier and a seed value. The session identifier may be a random or pseudo-random value that is unique to an authentication session. The seed value may be, as discussed above, a random or pseudo-random value used for a single authentication of the computing device 104 in conjunction with the session identifier. The processing unit 204 may also be configured to compute a first hash ("H1") using the session identifier, a second hash ("H2") using the session identifier and an alphanumeric code corresponding to an account being authenticated, and a third hash ("H3") using the H2 hash and a seed value. In some instances, the H3 hash may use a generated seed value. In other instances, the H3 hash may use a fallback seed value, which may be stored in an account profile 210 corresponding to an account being authenticated.

The processing unit 204 may be further configured to validate a hash received from the computing device 104. The received hash may be accompanied by a session identifier and may be a hash of an alphanumeric code input in the computing device 104 by the user 106 or may hash of the aforementioned hash in combination with a seed value. The processing unit 204 may accordingly validate the received hash by comparing it to the computed H2 or H3 hash in order to authenticate the computing device 104.

The processing server 102 may also include a transmitting unit 206. The transmitting unit 206 may be configured to transmit data over one or more networks via one or more network protocols, such as the first communication protocol 108 and the second communication protocol 110. The transmitting unit 206 may be configured to transmit the session identifier to the computing device 104 via the first communication protocol 108 and to transmit the H1 hash and seed value to the remote notification service 112 for pushing to the computing device 104 via the second communication protocol 110.

The processing server 102 may also include a memory 212. The memory 212 may be configured to store data suitable for performing the functions of the processing server 102 disclosed herein. For example, the memory 212 may be configured to store rules regarding the generation of the session identifier and seed values, rules regarding registration of an account (e.g., alphanumeric code creation rules, etc.), and additional data that will be apparent to persons having skill in the relevant art.

In some embodiments, the processing unit 204 may be configured to generate a message following validation of the hash received from the computing device 104. For instance, the generated message may indicate if the validation was successful (e.g., and the computing device 104 authenticated), if the validation failed, if validation was not performed, why a validation was not performed (e.g., blocked account, lack of a seed value, wrong session identifier, etc.), why a validation failed (e.g., incorrect alphanumeric code, incorrect seed value, too many attempts, etc.), why a validation was successful (e.g., seed value used, fallback seed used, etc.), etc. The transmitting unit 206 may be configured to transmit the message to the computing device 104 (e.g., via the first communication protocol 108) or a third party.

For instance, the message may be transmitted to the computing device 104 for providing to a wallet application program on the computing device 104 to initiate conveyance of payment credentials to a point of sale. In another example, the message may be transmitted to a third party, such as a payment network or a financial institution, to indicate that the computing device 104 is genuine. Additional recipients and uses of data regarding successful or unsuccessful authentication of a computing device 104 using the methods and systems discussed herein will be apparent to persons having skill in the relevant art.

It will also be apparent to persons having skill in the relevant art that the processing server 102 may include additional components configured to perform additional functions, and/or that the components illustrated in FIG. 2 as being included in the processing server 102 and discussed herein may be further configured to perform additional functions of the processing server 102. For example, if the computing device 104 is being authenticated for use in a payment transaction, the processing server 102 may be a part of a payment network or financial institution involved in the payment transaction, and may be further configured to perform necessary functions, such as the processing of payment transactions and storage of transaction account data. In another example, the components of the processing server 102 may be further configured to implement additional methods of authentication, such as the use of a token generated or identified and validated by the processing unit 304 of computing device 104 (described below).

Computing Device

Figure 3:
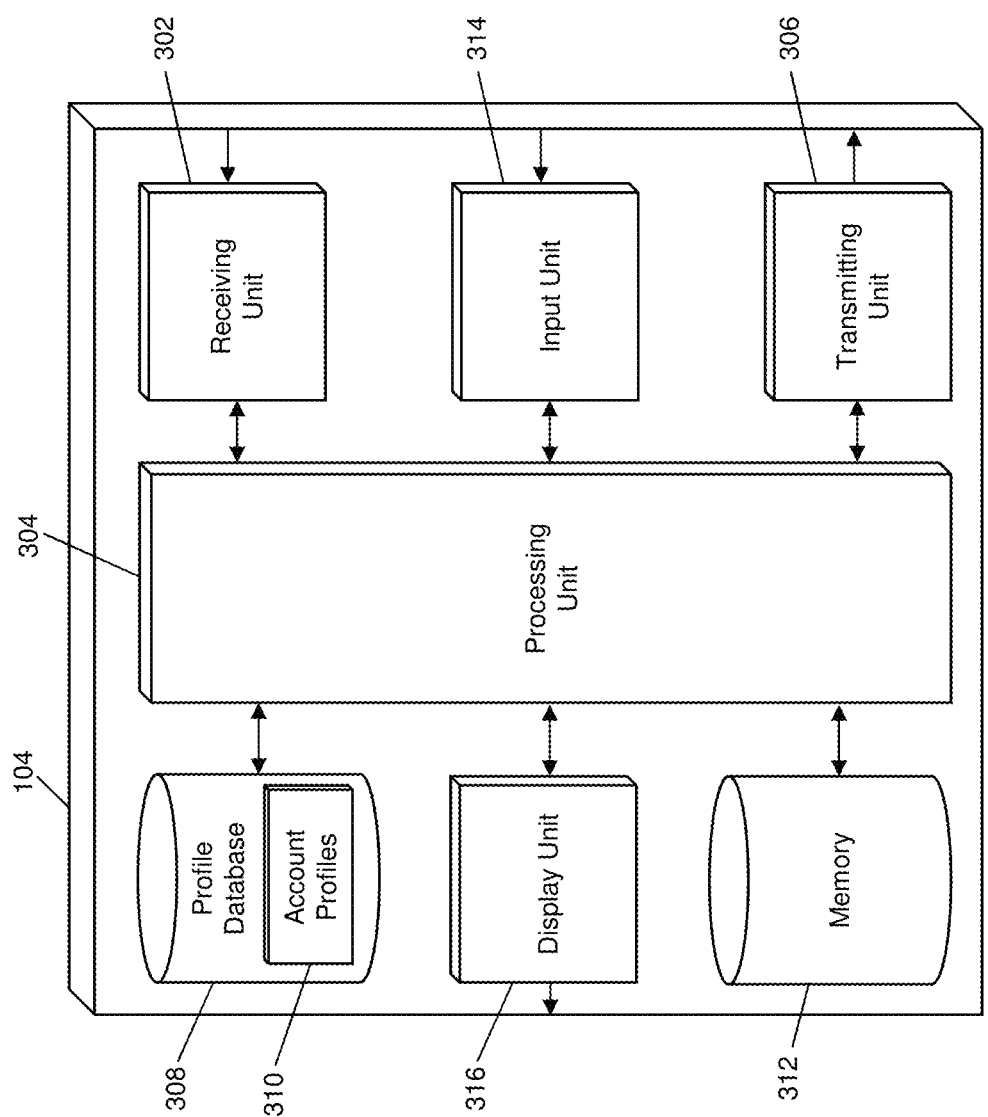
FIG. 3 is a block diagram illustrating the computing device of FIG. 1 that is authenticated via an alphanumeric code in accordance with exemplary embodiments.

FIG. 3 illustrates an embodiment of the computing device 104 of the system 100. It will be apparent to persons having skill in the relevant art that the embodiment of the computing device 104 illustrated in FIG. 3 is provided as illustration only and may not be exhaustive to all possible configurations of the computing device 104 suitable for performing the functions as discussed herein. For example, the computer system 800 illustrated in FIG. 8 and discussed in more detail below may be a suitable configuration of the computing device 104.

The computing device 104 may include a receiving unit 302. The receiving unit 302 may be configured to receive data over one or more networks via one or more network protocols, such as receiving data from the processing server 102 via the first communication protocol 108 and from the remote notification service 112 via the second communication protocol 110. The receiving unit 302 may receive an authentication request, which may include a session identifier for use in authentication of the computing device 104. The receiving unit 302 may also receive the H1 hash and a seed value from the remote notification service 112.

The computing device 104 may also include a processing unit 304. The processing unit 304 may be configured to compute a fourth hash ("H4") using the received session identifier. The processing unit 304 may validate the received H1 hash by comparing it to the computed H4 hash, to validate the received authentication request.

The computing device 104 may further include an input unit 314. The input unit 314 may be configured to receive input from the user 106 via one or more input devices. The input devices may include one or more of a keyboard, mouse, click wheel, scroll wheel, touch screen, microphone, camera, or any other suitable type of input device. The input unit 314 may receive input of an alphanumeric code from the user 106 for use in the authentication of the user 106 and computing device 104.

The processing unit 304 may be configured to compute a fifth hash ("H5") using the alphanumeric code input by the user 106 and received by the input unit 314. The processing unit 304 may also compute a sixth hash ("H6") using the H5 hash and the seed value received from the remote notification service 112 by the receiving unit 302. In instances where no seed value may be received, the processing unit 304 may be configured to compute the H6 hash using a fallback seed. The fallback seed may be previously received by the receiving unit 302 following a prior authentication, and may be stored in a memory 312 or an account profile 310 of the computing device 104 until its use.

The computing device 104 may further include a transmitting unit 306. The transmitting unit 306 may be configured to transmit data over one or more networks via one or more network protocols, such as the first communication protocol 108 and second communication protocol 110. The transmitting unit 306 may be configured to transmit the computed H6 hash and the session identifier to the processing server 102 via the first communication protocol 108 in order to authenticate the computing device 104. The receiving unit 302 may be further configured to receive a validation message from the processing server 102 following the transmitting of the H6 hash indicating the successful or unsuccessful authentication of the computing device 104 based on validation of the H6 hash. In instances where the authentication is unsuccessful, the user 106 may be prompted to input the alphanumeric code again and repeat the process.

The computing device 104 may also include a profile database 308. The profile database 308 may be configured to store one or more account profiles 310. Each account profile 310 may be configured to store data related to an account registered with the processing server 102. Each account profile 310 may include at least an account identifier associated with the related account, such as included in the corresponding account profile 210 in the account database 208 of the processing server 102.

In instances where the profile database 308 may include multiple account profiles 310, the user 106 may first select an account prior to authentication. In such an instance, the computing device 104 may include a display unit 316, which may be configured to display a list of accounts for selection by the user 106. The display unit may be any type of display unit or device suitable for displaying data to a user 106 of the computing device 106 as will be apparent to persons having skill in the relevant art, such as a liquid crystal display, light-emitting diode display, cathode ray tube display, capacitive touch display, etc. The user 106 may then select an account using the input unit 314. The transmitting unit 306 may then transmit the account identifier for the selected account to the processing server 102 in an authentication request, for which a session identifier and seed value may be returned to be received by the receiving unit 302.

The authentication request may also include a device identifier associated with the computing device 104. The device identifier may be stored in the selected account profile 310, or may be stored in a memory 312 and associated with all of the account profiles 310. The memory 312 may be configured to store the device identifier and any other data suitable for performing the functions disclosed herein, such as program code for one or more application programs, such as a wallet application program, an application program for selecting an account profile 310 and inputting the alphanumeric code, for registering with the processing server 102, etc., the received validation message or data included therein, communication information, etc. Additional data that may be stored in the memory 312 will be apparent to persons having skill in the relevant art.

It will also be apparent to persons having skill in the relevant art that the computing device 104 may include additional components configured to perform additional functions, and/or that the components illustrated in FIG. 3 as being included in the computing device 104 and discussed herein may be further configured to perform additional functions of the computing device 104, such as traditional functions of a computing communication device, such as those suitable for conducting telephone calls, sending and receiving text messages, browsing the Internet, etc. In another example, the components of the computing device 104 may be configured to perform functions associated with additional methods of authentication, such as the receipt and transmission of a token using the first and second communication protocols 108 and 110.

Process for Authenticating the Computing Device

Figure 4A:
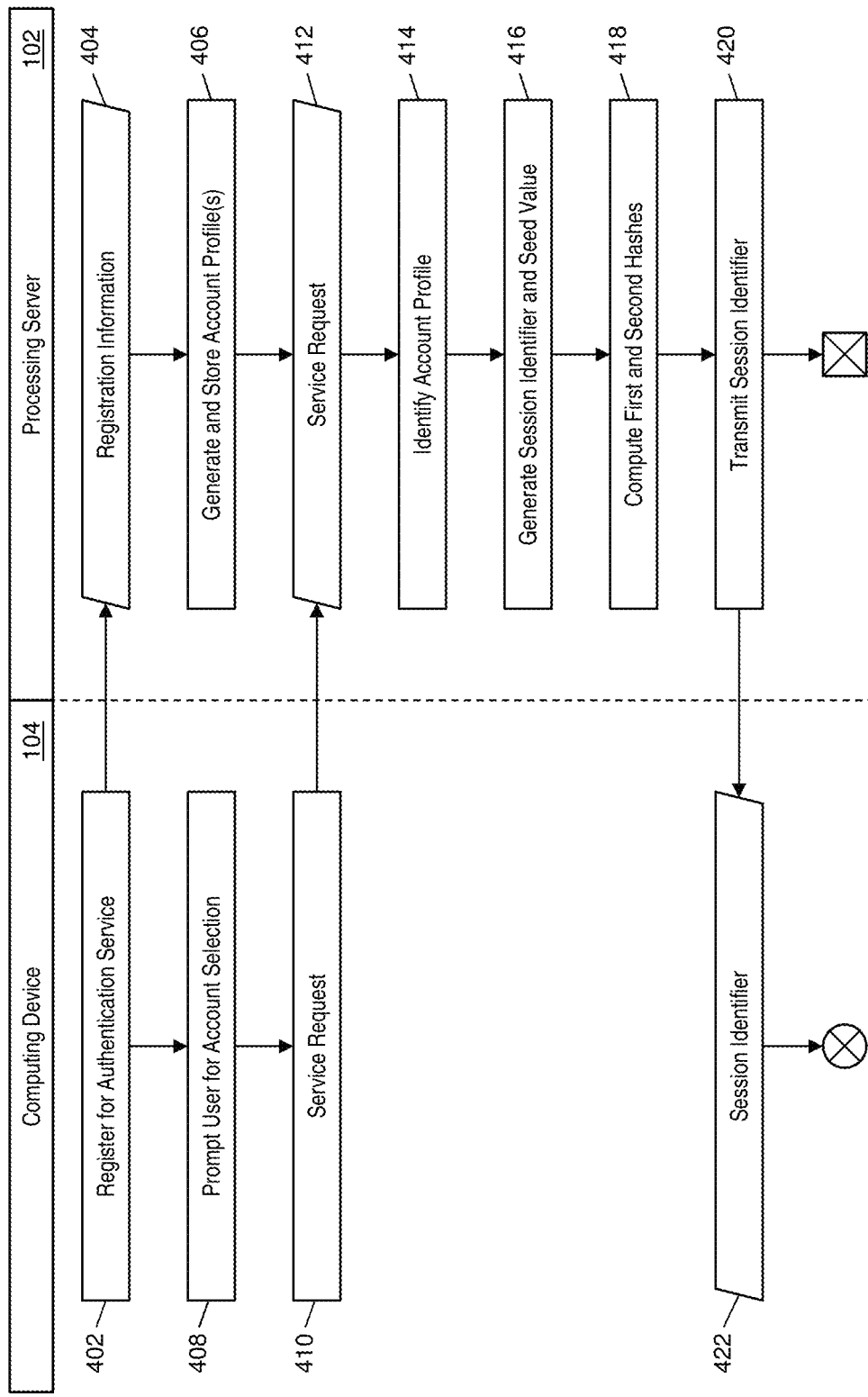
FIGS. 4A and 4B are a flow diagram illustrating a process for authenticating a computing device via input of an alphanumeric code and dual channel authentication in accordance with exemplary embodiments.
Figure 4B:
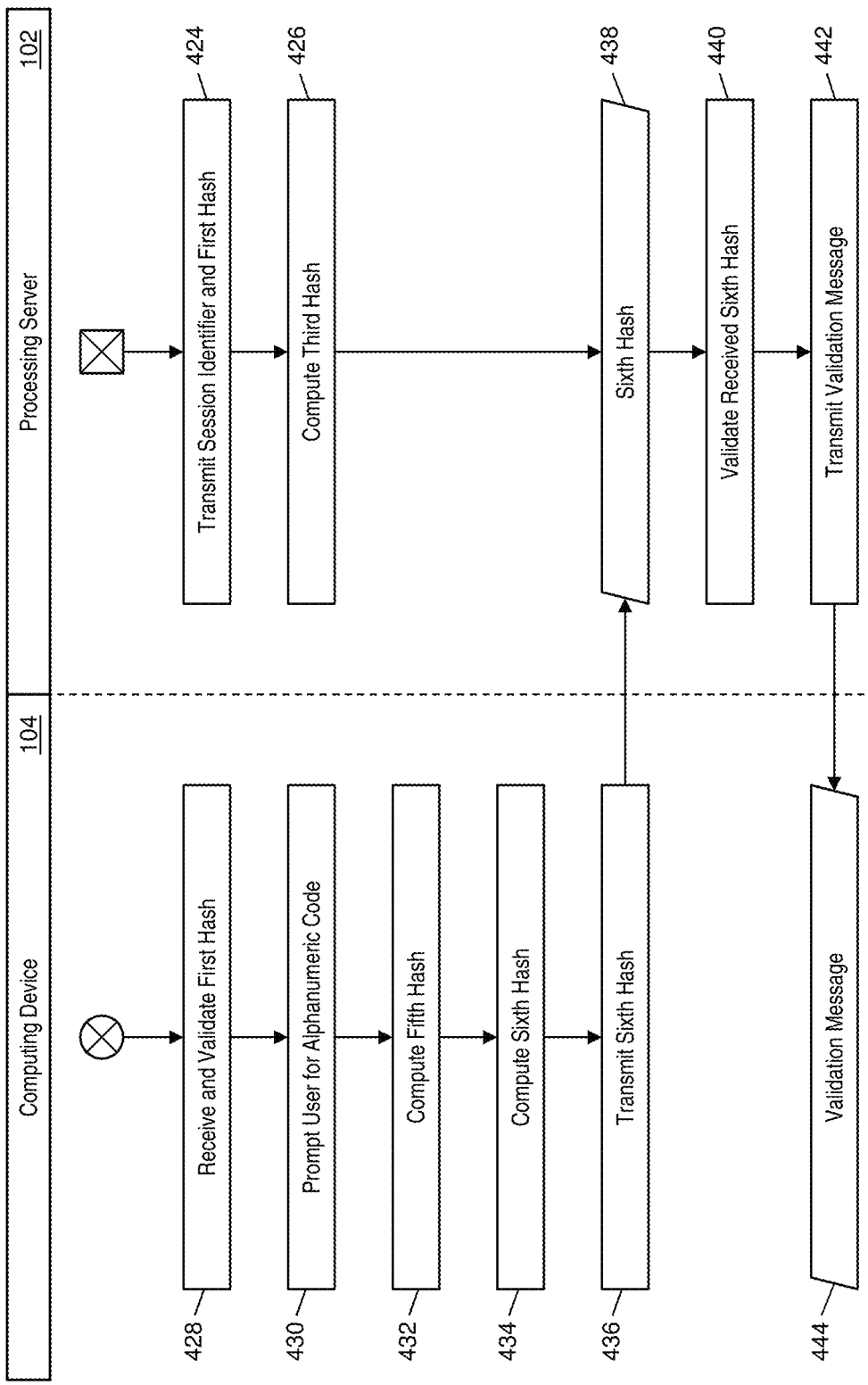

FIGS. 4A and 4B illustrate a process for authenticating the computing device 104 using the system 100 illustrated in FIG. 1, which utilizes an alphanumeric code input by the user 106 and the first and second communication protocols 108 and 110. In step 402, the user 106 may register for the authentication service of the processing server 102 using the computing device 104. As part of the registration, the user 106 may input (e.g., via the input unit 314) an alphanumeric code to be used in the authentication, and the computing device 104 may identify (e.g., via the processing unit 304) a device identifier associated with the computing device 104. The data may be transmitted by the transmitting unit 306 (e.g., via the first communication protocol 108) to the processing server 102. In step 404, the receiving unit 202 of the processing server 102 may receive the account registration data. In some instances, the account registration data may include an account identifier. In other instances, the processing unit 204 of the processing server 102 may identify an account identifier, which may be transmitted back to the computing device 104 by the transmitting unit 206.

In step 406, the processing unit 204 may generate an account profile 210 for storage in the account database 208, the account profile 210 including the received or identified account identifier and the received device identifier and alphanumeric code. In step 408, the display unit 316 of the computing device 104 may display a prompt to the user 106 requesting the selection of an account to be authenticated. For instance, the user 106 may be attempting to conduct a payment transaction using a wallet application program on the computing device 104, and the user 106 may be prompted to select an account associated with a transaction account to be used to fund the payment transaction. The user 106 may select an account using the input unit 314, and the corresponding account profile 310 identified by the processing unit 304. It will be apparent to persons having skill in the relevant art that step 408 may be optional, such as in instances where the computing device 104 may only include a single account.

In step 410, the transmitting unit 306 may transmit a service request to the processing server 102. In step 412, the receiving unit 202 of the processing server 102 may receive the service request, which may include at least the account identifier associated with the selected account. In some instances, the service request may further include the device identifier associated with the computing device 104. In step 414, the processing unit 202 may identify an account profile 210 in the account database 208 for authentication using the received account identifier and, if applicable, device identifier.

In step 416, the processing unit 204 may generate a session identifier and a seed value for use in authenticating the computing device 104. In some embodiments, the session identifier and/or seed value may be stored in the identified account profile 210. In step 418, the processing unit 204 may compute a first hash (e.g., the H1 hash) using the session identifier, and may compute a second hash (e.g., the H2 hash) using the session identifier and the alphanumeric code included in the identified account profile 210. In step 420, the transmitting unit 206 may transmit the session identifier to the computing device 104 using the first communication protocol 108. In step 422, the receiving unit 302 of the computing device 104 may receive the session identifier.

In step 424, the transmitting unit 206 may transmit the session identifier and the H1 hash to the remote notification service 112 for pushing to the computing device 104 via the second communication protocol 110. In some embodiments, the seed value may also be transmitted to the remote notification service 112 for push to the computing device 104. In step 426, the processing unit 304 may compute a third hash (e.g., the H3 hash) using the generated seed value and the H2 hash. It will be apparent to persons having skill in the relevant art that step 426 may be an optional step, and may not be performed if a seed value is not used. In step 428, the receiving unit 302 of the computing device 104 may receive the session identifier and H1 hash, and, if applicable, the seed value, from the remote notification service 112. The processing unit 304 of the computing device 104 may validate the received H1 hash by computing a fourth hash (e.g., the H4 hash) using the session identifier received from the processing server 102 in step 422 and comparing it to the received H1 hash.

If the hash is validated, then, in step 430, the user 106 may be prompted to enter the alphanumeric code using the input unit 314. The user 106 may provide the alphanumeric code, and then, in step 432, the processing unit 304 may compute a fifth hash (e.g., the H5 hash) using the input alphanumeric code. In step 434, the processing unit 304 may compute a sixth hash (e.g., the H6 hash) using the H5 hash and the seed value received from the remote notification service 112. In instances where no seed value has been received, the H6 hash may be computed using a fallback seed, which may be stored in the identified account profile 310 and/or memory 312 of the computing device. It will be apparent to persons having skill in the relevant art that, in some embodiments, the seed value or fallback seed may not be used and the H5 hash used in place of the H6 hash.

In step 436, the transmitting unit 306 of the computing device 104 may transmit the computed H6 hash and the session identifier to the processing server 102. In step 438, the receiving unit 202 of the processing server 102 may receive the H6 has and the session identifier. It will be apparent to persons having skill in the relevant art that the session identifier may be used to keep track of the authentication that is being performed, such as in instances where the processing server 102 may be performing multiple authentications at once.

In step 440, the processing unit may validate the received H6 hash by comparing it to the previously computed H3 hash. It will be apparent to persons having skill in the relevant art that, in instances where the computing device 104 may compute the H6 hash using a fallback seed, the processing unit 204 of the processing server 102 may compute one or more alternative H3 hashes using fallback seed(s) associated with the account profile 210 being authenticated for use in validation of the received H6 hash. Once validation is completed, then, in step 442, the transmitting unit 206 may transmit a validation message to the computing device 104. In step 444, the receiving unit 302 of the computing device 104 may receive the validation message, which may indicate the successful or unsuccessful authentication of the computing device 104 based on the performed validation.

In some embodiments, if the authentication was unsuccessful, the process may return to step 430 and repeat, to provide another attempt for the user 106 to authenticate the computing device 104. In some instances, the processing server 102 may be configured to accept a limited number of such attempts. In such an instance, the processing server 102 may block the account from being used if the number of attempts has been exceeded. In such a case, once the account has been blocked, the validation message may indicate the blocking of the account, which may instruct the computing device 104 to no longer prompt the user 106 to enter the alphanumeric code and may instead inform the user 106 of the blocking of the account.

In instances where the authentication may be performed for the conducting of a payment transaction using the computing device 104, the computing device 104 may continue to perform functions that will be apparent to persons having skill in the relevant art based on the validation message. For example, if the validation message indicates successful authentication, the computing device 104 may then convey payment details associated with a transaction account to a point of sale for use in the payment transaction being conducted.

Validation of the Alphanumeric Code

Figure 5:
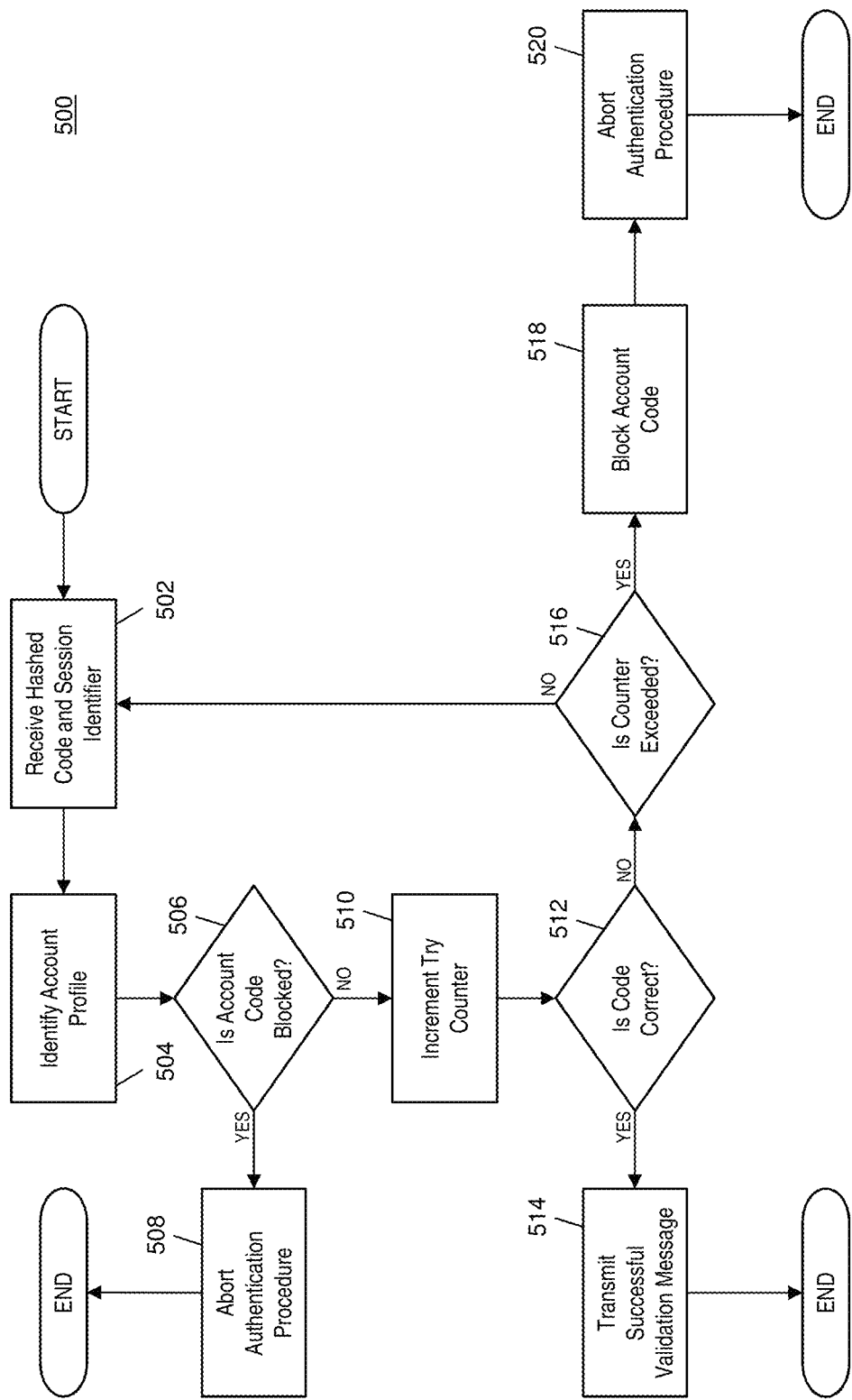
FIG. 5 is a flow diagram illustrating a process for authentication of a computing device performed by the processing server of FIG. 2 in accordance with exemplary embodiments.

FIG. 5 illustrates a process 500 that illustrates the validation of the alphanumeric code input by the user 106 by the processing server 102, such as takes place in step 440 in process 400 as illustrated in FIG. 4B and discussed above.

In step 502, the receiving unit 202 of the processing server 102 may receive the hashed alphanumeric code (e.g., the H5 hash) or the H6 hash that is computed using the H5 hash and the seed or fallback seed value. The receiving unit 202 may also receive a session identifier that corresponds to the authentication being performed. In step 504, the processing unit 204 may identify the corresponding account profile 210, such as by using the session identifier and/or data associated with the session identifier.

In step 506, the processing unit 204 may determine if the account has been blocked. The determination may be based on data included in the identified account profile 210, such as a flag that indicates that the account profile 210 is blocked, an incorrect device identifier accompanies the received hash, etc. If the account is blocked, then, in step 508, the processing unit 204 may abort the authentication procedure. Aborting of the authentication procedure may include transmitting, by the transmitting unit 206, a validation message to the computing device 104 that indicates that the selected account is blocked. In some instances, a message may also be transmitted to a third party, such as financial institution associated with a selected account, to inform them of the attempted use of a blocked account.

If the account is not blocked, then, in step 510, the processing unit 204 may increment a counter. The counter may be representative of a number of attempts made to authenticate the computing device 104. In some instances, the counter may be tied to the session identifier (e.g., a separate counter for each session). In other instances, the counter may be associated with the selected account (e.g., and stored in the account profile 210). In such an instance, the counter may be reset upon a successful authentication. It will be apparent to persons having skill in the relevant art that step 510 may optionally be performed following a first failed attempt.

In step 512, the processing unit 204 may determine if the alphanumeric code input by the user 106 is correct by performing a validation of the received hash. The received hash may be validated by the computing of the H2 and, if applicable, H3 hashes by the processing unit 204 and then comparing the received hash with the corresponding H2 or H3 hash. If the values of the hashes are the same, then the code input by the user 106 may be considered correct, and the authentication successful. If it is thus determine that the code is correct, then, in step 514, the transmitting unit 206 may transmit a validation message indicating successful authentication to the computing device 104. In some instances, the try counter may be reset. In some embodiments, a validation message may also be transmitted to a third party. In instances where additional authentication methods may be used, step 512 may include performing functions related to the additional authentication methods, such as the validation of a token.

If the validation is unsuccessful, and the code thereby considered incorrect, then, in step 516, the processing unit 204 may determine if the counter has exceeded a predetermined value, which may indicate that the authentication has been performed an unacceptable number of times. If the counter has not been exceeded, then the process 500 may return to step 502, where a new hash may be received and the process repeated. In some instances, a validation message may be transmitted to the computing device 104 to inform the user 106 of the unsuccessful authentication and request the input of another alphanumeric code.

If the counter has exceeded the predetermined number, then, in step 518, the processing unit 204 may block the account, such as by updating a flag in the account profile 210. In step 520, the processing unit 204 may execute procedures for aborting the authentication process, such as by transmitting a validation message to the computing device 104 as discussed above.

First Exemplary Method for Authenticating a Computing Device

Figure 6:
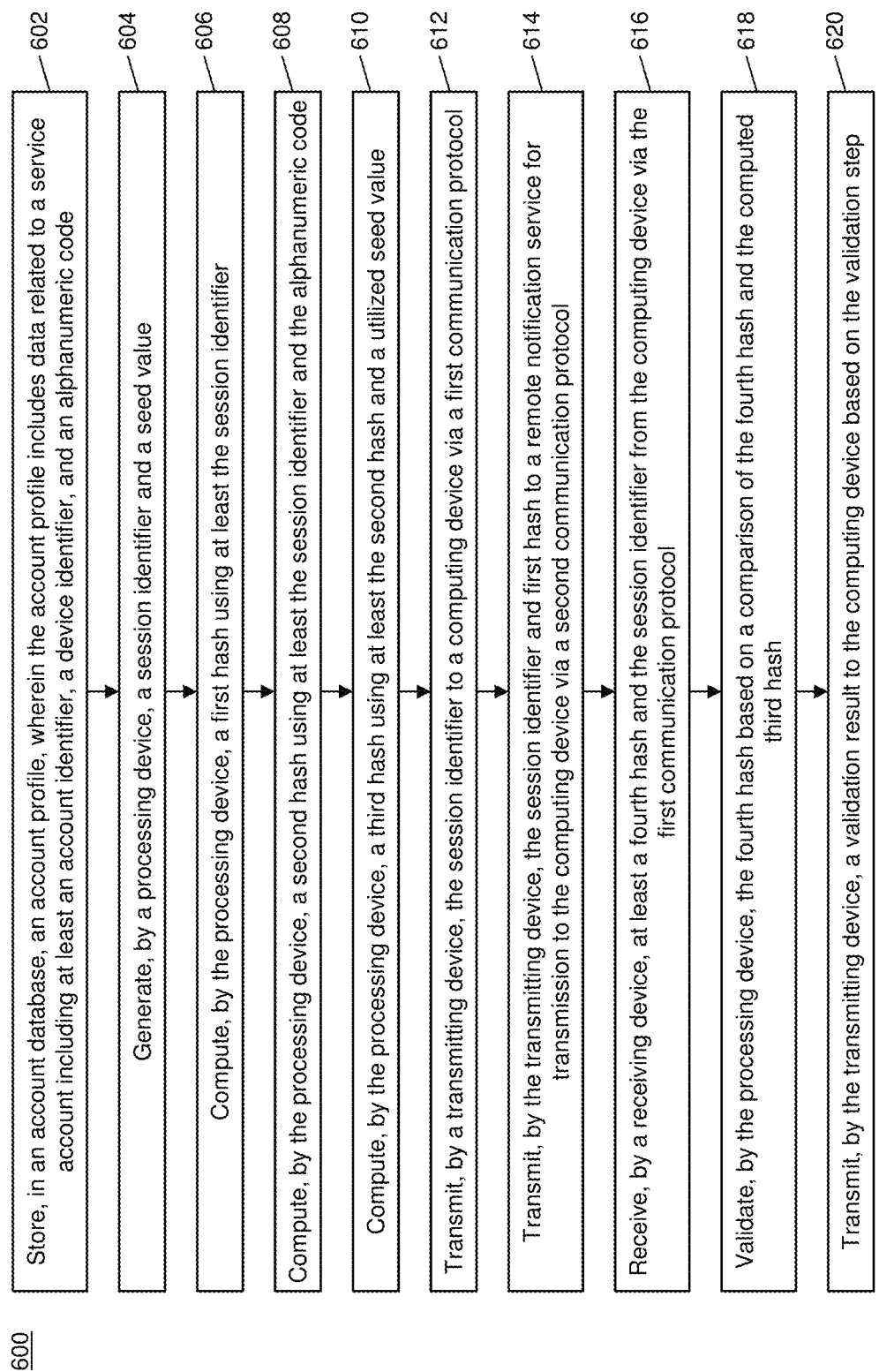
FIGS. 6 and 7 are flow charts illustrating exemplary methods for authenticating a computing device in accordance with exemplary embodiments.

FIG. 6 illustrates a method 600 for authenticating a computing device using an alphanumeric code and dual channel authentication.

In step 602, an account profile (e.g., an account profile 210) may be stored in an account database (e.g., the account database 208), wherein the account profile 210 includes data related to a service account including at least an account identifier, a device identifier, and an alphanumeric code. In step 604, a session identifier and a seed value may be generated by a processing device (e.g., the processing unit 204). In step 606, a first hash (e.g., the H1 hash) may be computed by the processing device 204 using at least the session identifier.

In step 608, a second hash (e.g., the H2 hash) may be computed by the processing device 204 using at least the session identifier and the alphanumeric code. In step 610, a third hash (e.g., the H3 hash) may be computed by the processing device 204 using at least the second hash and a utilized seed value. In one embodiment, the utilized seed value may be the generated seed value. In step 612, the session identifier may be transmitted, by a transmitting device (e.g., the transmitting unit 206) to a computing device (e.g., the computing device 104) via a first communication protocol (e.g., the first communication protocol 108).

In step 614, the session identifier and first hash may be transmitted, by the transmitting device 206, to a remote notification service (e.g., the remote notification service 112) for transmission to the computing device 104 via a second communication protocol (e.g., the second communication protocol 110). In step 616, a fourth hash (e.g., the H5 or H6 hash) and the session identifier may be received, by a receiving device (e.g., the receiving unit 202), from the computing device 104 via the first communication protocol 108. In step 618, the processing device 204 may validate the fourth hash based on a comparison of the fourth hash and the computed third hash. In step 620, a validation result may be transmitted, by the transmitting device 620, to the computing device 104 based on the validation step 618.

In one embodiment, the method 600 may further include: receiving, by the receiving device 202, a specific account identifier and a specific device identifier from the computing device 104 via the first communication protocol 108; and validating, by the processing device 104, the received specific account identifier and specific device identifier as the account identifier and device identifier included in the account profile 210, wherein the received specific account identifier and specific device identifier are validated prior to transmitting the session identifier to the computing device 104 in step 612.

In some embodiments, the method 600 may further include receiving, by the receiving device 202, configuration information from the computing device 104 via the first communication protocol 108 and identifying, by the processing device 204, the utilized seed value based on the received configuration information, wherein the utilized seed value is identified prior to computing of the third hash. In a further embodiment, transmitting the session identifier and first hash to the remote notification service 112 may further include transmitting the generated seed value to the remote notification service.

Second Exemplary Method for Authenticating a Computing Device

Figure 7:
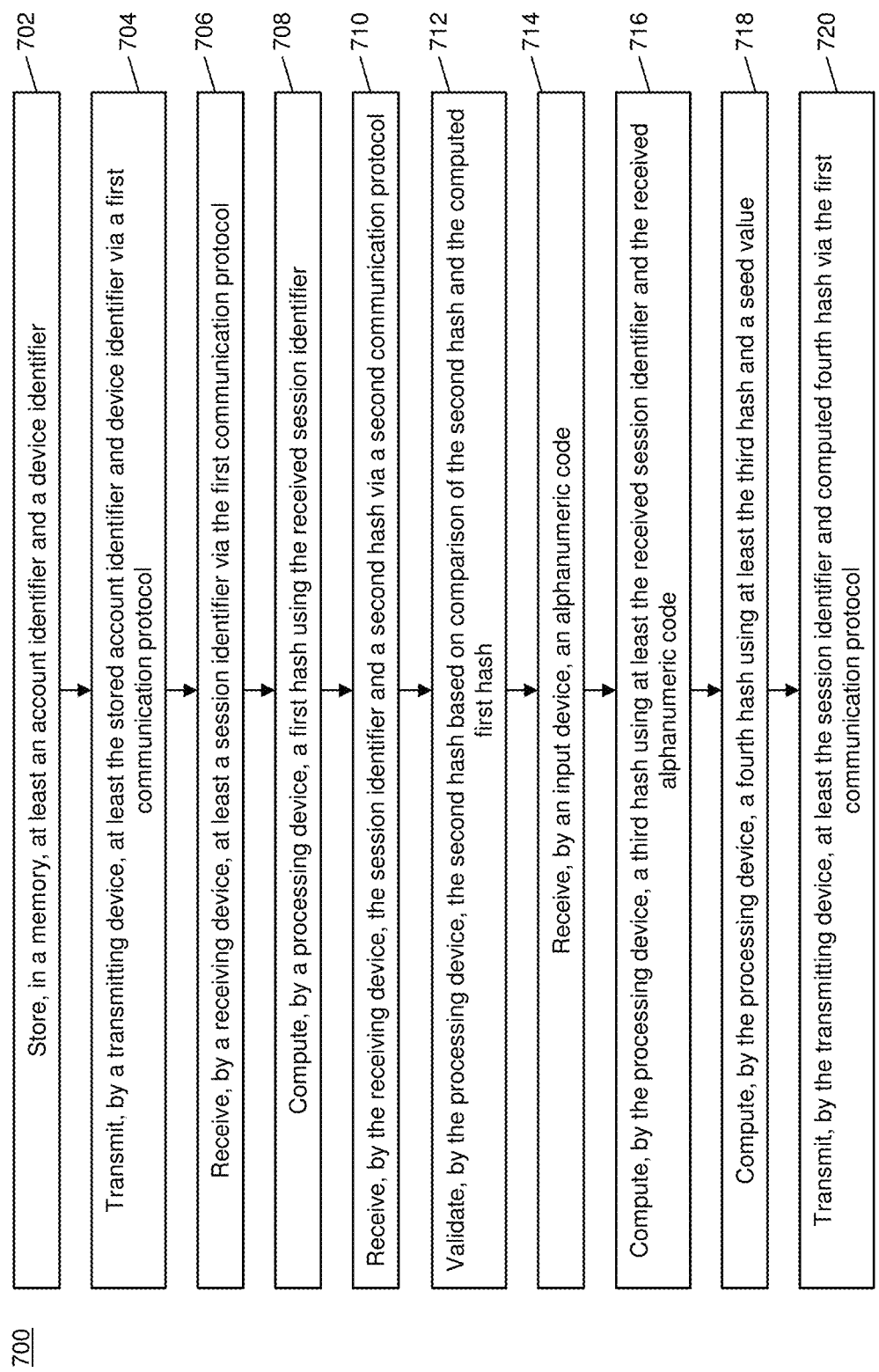

FIG. 7 illustrates a method 700 for authenticating a computing device using an alphanumeric code and dual channel authentication.

In step 702, at least an account identifier and a device identifier may be stored in a memory (e.g., the memory 312). In step 704, at least the stored account identifier and device identifier may be transmitted, by a transmitting device (e.g., the transmitting unit 306), via a first communication protocol (e.g., the first communication protocol 108). In step 706, at least a session identifier may be received, by a receiving device (e.g., the receiving unit 302), via the first communication protocol 108. In step 708, a first hash (e.g., the H4 hash) may be computed, by a processing device (e.g., the processing unit 304) using the received session identifier.

In step 710, the session identifier and a second hash (e.g., the H3 hash) may be received, by the receiving device 302, via a second communication protocol (e.g., the second communication protocol 110). In step 712, the processing device 304 may validate the second hash based on comparison of the second hash and the computed first hash. In step 714, an alphanumeric code may be received by an input device (e.g., the input unit 314). In step 716, a third hash (e.g., the H5 hash) may be computed by the processing device 304 using at least the received session identifier and the received alphanumeric code.

In step 718, a fourth hash (e.g., the H6 hash) may be computed, by the processing device 204, using at least the third hash and a seed value. In one embodiment, the method 700 may further include receiving, by the receiving device 302, the seed value via the second communication protocol 110. In another embodiment, the memory 312 may further include the seed value. In some embodiments, the memory 312 may further include a fallback seed value, and the fourth hash may be computed (i) using the fallback seed value If the session identifier and second hash received via the second communication protocol are not accompanied by a primary seed value; or (ii) using the primary seed value if the session identifier and second hash received via the second communication protocol is accompanied by a primary seed value.

In step 720, at least the session identifier and the computed fourth hash may be transmitted, by the transmitting device 306, via the first communication protocol 108. In one embodiment, the memory 312 may further include a plurality of account identifiers, and the method may further include receiving, by the input device 314, a selection of a specific account identifier of the plurality of account identifiers, wherein the stored account identifier transmitted via the first communication protocol 108 is the specific account identifier.

Computer System Architecture

Figure 8:
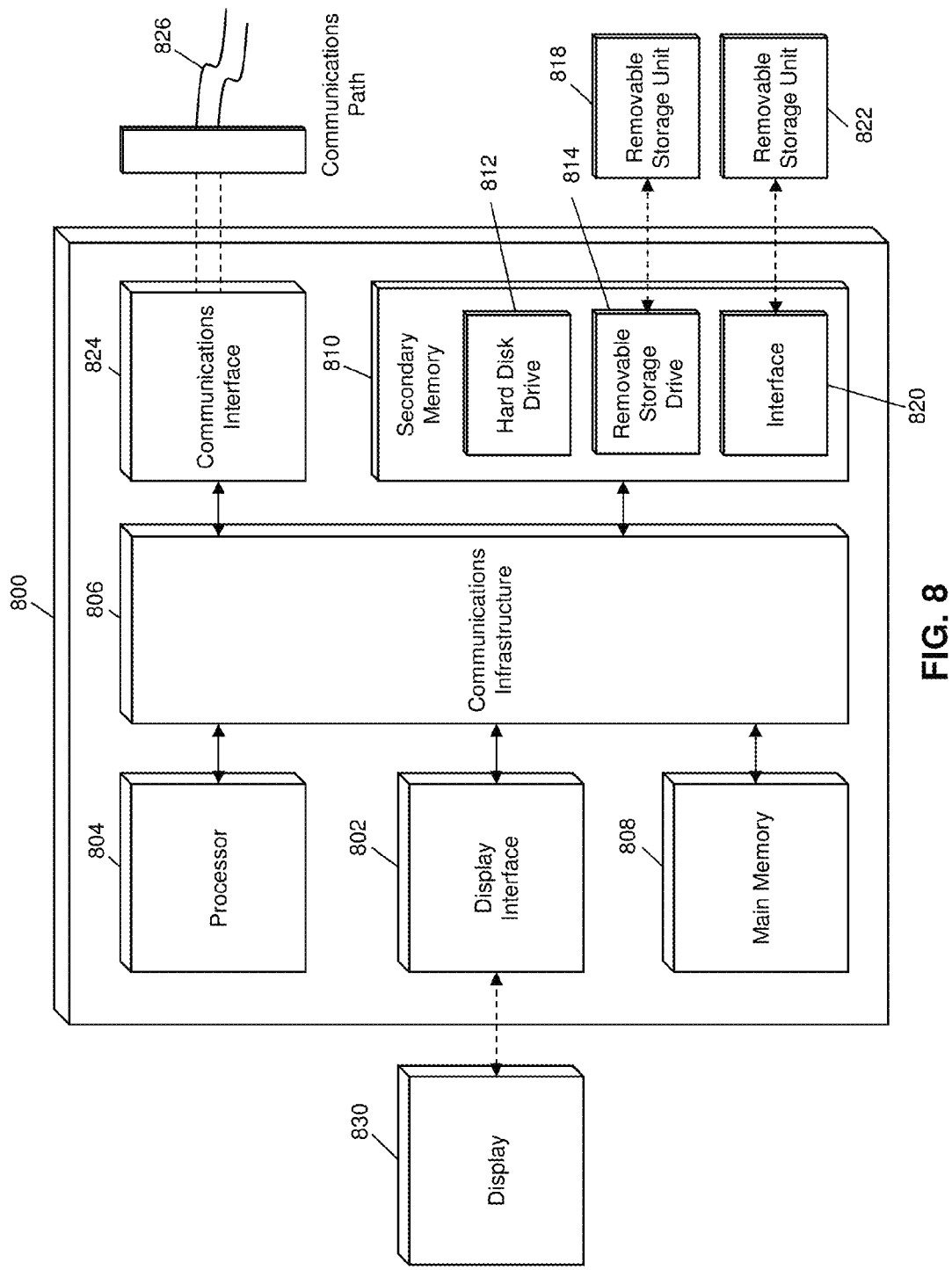
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 and computing device 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a computing communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

Techniques consistent with the present disclosure provide, among other features, systems and methods for authenticating a computing device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authenticating a computing device, comprising:
storing, in an account database, an account profile, wherein the account profile includes data related to a service account including at least an account identifier, a device identifier, and an alphanumeric code;
generating, by a processing device, a session identifier and a seed value;
computing, by the processing device, a first hash using at least the session identifier;
computing, by the processing device, a second hash using at least the session identifier and the alphanumeric code;
computing, by the processing device, a third hash using at least the second hash and a utilized seed value;
transmitting, by a transmitting device, the session identifier to a computing device via a first communication protocol;
transmitting, by the transmitting device, the session identifier and first hash to a remote notification service for transmission to the computing device via a second communication protocol;
receiving, by a receiving device, at least a fourth hash and the session identifier from the computing device via the first communication protocol;
validating, by the processing device, the fourth hash based on a comparison of the fourth hash and the computed third hash; and
transmitting, by the transmitting device, a validation result to the computing device based on the validation step.

2. The method of claim 1, further comprising:
receiving, by the receiving device, a specific account identifier and a specific device identifier from the computing device via the first communication protocol; and
validating, by the processing device, the received specific account identifier and specific device identifier as the account identifier and device identifier included in the account profile, wherein
the received specific account identifier and specific device identifier are validated prior to transmitting the session identifier to the computing device.

3. The method of claim 1, wherein the utilized seed value is the generated seed value.

4. The method of claim 1, further comprising:
receiving, by the receiving device, configuration information from the computing device via the first communication protocol; and
identifying, by the processing device, the utilized seed value based on the received configuration information, wherein
the utilized seed value is identified prior to computing of the third hash.

5. The method of claim 4, wherein transmitting the session identifier and first hash to the remote notification service for transmission further includes transmitting the generated seed value to the remote notification service.

6. A method for authenticating a computing device, comprising:
storing, in a memory, at least an account identifier and a device identifier;
transmitting, by a transmitting device, at least the stored account identifier and device identifier via a first communication protocol;
receiving, by a receiving device, at least a session identifier via the first communication protocol;
computing, by a processing device, a first hash using the received session identifier;
receiving, by the receiving device, the session identifier and a second hash via a second communication protocol;
validating, by the processing device, the second hash based on comparison of the second hash and the computed first hash;

receiving, by an input device, an alphanumeric code;

computing, by the processing device, a third hash using at least the received session identifier and the received alphanumeric code;

computing, by the processing device, a fourth hash using at least the third hash and a seed value; and transmitting, by the transmitting device, at least the session identifier and computed fourth hash via the first communication protocol.

7. The method of claim 6, further comprising:

receiving, by the receiving device, the seed value via the second communication protocol.

8. The method of claim 6, wherein the memory further includes the seed value.

9. The method of claim 6, wherein the memory further includes a fallback seed value, and the fourth hash is computed (i) using the fallback seed value if the session identifier and second hash received via the second communication protocol are not accompanied by a primary seed value; or (ii) using the primary seed value if the session identifier and second hash received via the second communication protocol are accompanied by a primary seed value.

10. The method of claim 6, wherein the memory includes plurality of account identifiers, and the method further comprises:

receiving, by the input device, a selection of a specific account identifier of the plurality of account identifiers, wherein the stored account identifier transmitted via the first communication protocol is the specific account identifier.

11. A system for authenticating a computing device, comprising:

an account database configured to store an account profile, wherein the account profile includes data related to a service account including at least an account identifier, a device identifier, and an alphanumeric code;

a processing device configured to generate a session identifier and a seed value, compute a first hash using at least the session identifier, compute a second hash using at least the session identifier and the alphanumeric code, and compute a third hash using at least the second hash and a utilized seed value;

a transmitting device configured to transmit the session identifier to a computing device via a first communication protocol, and transmit the session identifier and first hash to a remote notification service for transmission to the computing device via a second communication protocol; and a receiving device configured to receive at least a fourth hash and the session identifier from the computing device via the first communication protocol, wherein the processing device is further configured to validate the fourth hash based on a comparison of the fourth hash and the computed third hash; and the transmitting device is further configured to transmit a validation result to the computing device based on the validation step.

12. The system of claim 11, wherein the receiving device is further configured to receive a specific account identifier and a specific device identifier from the computing device via the first communication protocol, the processing device is further configured to validate the received specific account identifier and specific device identifier as the account identifier and device identifier included in the account profile, and the received specific account identifier and specific device identifier are validated prior to transmitting the session identifier to the computing device.

13. The system of claim 11, wherein the utilized seed value is the generated seed value.

14. The system of claim 11, wherein the receiving device is further configured to receive configuration information from the computing device via the first communication protocol, the processing device is further configured to identify the utilized seed value based on the received configuration information, and the utilized seed value is identified prior to computing of the third hash.

15. The system of claim 14, wherein transmitting the session identifier and first hash to the remote notification service for transmission further includes transmitting the generated seed value to the remote notification service.

16. A system for authenticating a computing device, comprising:

an input device;

a memory configured to store at least an account identifier and a device identifier;

a transmitting device configured to transmit at least the stored account identifier and device identifier via a first communication protocol;

a receiving device configured to receive at least a session identifier via the first communication protocol; and a processing device configured to compute a first hash using the received session identifier, wherein the receiving device is further configured to receive the session identifier and a second hash via a second communication protocol, the processing device is further configured to validate the second hash based on comparison of the second hash and the computed first hash, the input device is configured to receive an alphanumeric code;

the processing device is even further configured to compute a third hash using at least the received session identifier and the received alphanumeric code, and compute a fourth hash using at least the third hash and a seed value, and the transmitting device is further configured to transmit at least the session identifier and computed fourth hash via the first communication protocol.

17. The system of claim 16, wherein the receiving device, is further configured to receive the seed value via the second communication protocol.

18. The system of claim 16, wherein the memory further includes the seed value.

19. The system of claim 16, wherein the memory is further configured to store a fallback seed value, and the fourth hash is computed (i) using the fallback seed value if the session identifier and second hash received via the second communication protocol are not accompanied by a primary seed value; or (ii) using the primary seed value if the session identifier and second hash received via the second communication protocol are accompanied by a primary seed value.

20. The system of claim 16, wherein
the memory includes plurality of account identifiers,
the input device is further configured to receive a selection of a specific account identifier of the plurality of account identifiers, and
the stored account identifier transmitted via the first communication protocol is the specific account identifier.

* * * * *